United States Patent [19]

Foster

[11] 3,945,917

[45] Mar. 23, 1976

[54] DECOLORIZING METHOD FOR WASTE KRAFT PAPER MILL EFFLUENTS

[75] Inventor: Peter D. Foster, Columbia, Md.

[73] Assignee: Westvaco Corporation, New York, N.Y.

[22] Filed: Mar. 21, 1975

[21] Appl. No.: 560,328

Related U.S. Application Data

[63] Continuation-in-part of Ser. No. 412,406, Nov. 2, 1973, abandoned.

[52] U.S. Cl. .................... 210/28; 210/49; 162/29; 162/49
[51] Int. Cl.² ......................................... C02C 5/02
[58] Field of Search ............ 210/42, 45, 47, 49, 28, 210/51, 52, 37, 24; 162/16, 29, 49; 423/166, 554

[56] References Cited
UNITED STATES PATENTS

| | | | |
|---|---|---|---|
| 1,878,525 | 9/1932 | Kaplan | 210/45 |
| 3,627,679 | 12/1971 | Fuller | 210/45 |
| 3,655,337 | 4/1972 | Polinski et al. | 423/166 |
| 3,736,255 | 5/1973 | Ghassemi et al. | 210/45 |
| 3,740,363 | 6/1973 | Fuller | 210/45 |

Primary Examiner—Charles N. Hart
Assistant Examiner—Benoît Castel

[57] ABSTRACT

Considerable reduction in color of a kraft paper mill effluent has been found with the addition of barium ions ($Ba^{+2}$) to the effluent. Unlike the familiar lime decolorization process for kraft paper mill effluents, decolorization using barium is substantially independent of the pH of the effluent and the color removing mechanism is in the form of an occlusion of the color bodies from the effluent into the barium sulphate precipitate ($BaSO_4$) which forms from the sulphate ($SO_4$) already present in or added to the effluent. The amount of decolorization produced by the process of the present invention depends upon the amount of sulfate ions in the effluent, the amount of barium ion containing material added to the effluent and the relationship of the amount of barium to the amount of sulphate in the effluent. A slight excess of sulphate over the stoichiometric equivalent of barium is desired, and the total amount of barium ion containing material and sulphate that must be added to the effluent depends on the initial color of the effluent and the degree of decolorization desired.

2 Claims, No Drawings

DECOLORIZING METHOD FOR WASTE KRAFT PAPER MILL EFFLUENTS

BACKGROUND OF THE INVENTION

The present application is a continuation-in-part of applicant's copening application, Ser. No. 412,406, filed Nov. 2, 1973 for DECOLORIZING METHOD FOR WASTE KRAFT PAPER MILL EFFLUENTS, now abandoned.

Those familiar with the kraft pulping process are aware of the contaminating effects of discharging the waste aqueous effluents from the process into local streams of water. The waste effluents contain substantial amounts of biologically degradable matter which absorbs the oxygen that would otherwise be available to plant and animal life in the streams, and also contain highly colored color bodies that contribute to unsightly conditions in the local receiving streams of water.

In the conventional kraft process, fibrous cellulosic material such as wood chips are heated in a digestion state with a white liquor which contains sodium sulfide and sodium hydroxide. The digestion stage serves to dissolve from the cellulosic material a substantial part of the hemicelluloses, the lignin and other extractible organic materials contained therein, and the fibrous pulp so produced is separated from the resultant black liquor. The black liquor is subsequently sent to a recovery stage, the separated pulp is washed, and if bleached pulp is desired, the pulp is conventionally sent to a bleaching stage or stages. At the bleaching stage, the pulp is washed with water and then partially bleached in a first bleaching step with an aqueous solution which normally contains chlorine. The partially bleached pulp is washed again with water and passed on to a caustic extraction state where it is mixed with a sodium hydroxide solution and heated to remove the colored organic impurities oxidized in the first bleaching step. The extracted pulp is finally washed again with water and passed to one or more further bleaching steps as desired to complete the bleaching using one or more bleaching agents such as additional chlorine, peroxides, chlorine dioxide, and hypochlorite. Of course, other variations in bleaching sequence and in the various chemicals used could be practiced, but nevertheless in all of the processes, large quantities of water are used in the pulping and bleaching of wood fibers resulting in the production of many highly colored effluent waste streams.

Some of the prior art decolorization processes have concentrated on the separation of these highly colored streams for individual decolorizing treatment while others have simply acted on the combined effluent. In U.S. Pat. Nos. 3,120,464 and 3,531,370, the bleach plant effluent is treated with line for the purpose of reducing the color of the effluent. However, as noted in U.S. Pat. No. 3,652,407, which employs a decolorizing treatment for the bleach plant effluent consisting of a macroreticular absorbent resin, the lime treatments referred to in the two previously noted patents have merit but require very large quantities of lime. In addition, U.S. Pat. No. 3,740,363 describes a decolorizing treatment for a paper mill effluent consisting of a color precipitating reagent in the form of a metal salt. However, in the same patent, barium chloride is mentioned as being one metal salt that does not produce a good effluent color. Furthermore, each of the different decolorizing treatments described in the aforementioned patents require addtional steps for the purpose of adjusting the pH of the effluent before the desired decolorizing step. Accordingly, each of the prior are decolorizing treatments obviously serve a useful purpose, however, none of the knoown prior art decolorizing treatments for pulp and paper mill effluents operate on the effluent at a neutral pH as in the present invention, and none of the known treatments provide a decolorizing mechanism substantially as described herein over a wide range of pH values.

SUMMARY OF INVENTION

The present invention relates generally to a process for the decolorization of the final total effluent of a typical bleached or unbleached kraft pulping and paper making process and more specifically to a process for removing color from the effluent that is substantially independent of the pH of the effluent. In addition, the invention herein removes the color from the effluent by a mechanism heretofore unknown in the art.

In the best known and most widely practiced prior art process, the color bodies from a highly colored waste effluent are precipitated with a massive dose of lime and the precipitate obtained in calcined to recover the lime and burn the color bodies. In at least one other process using lime, the effluent is treated with lime and filtered to produce a filter cake containing the color bodies. The filter cake is passed back through the causticizer where the color bodies become dissovled in the cooking liquor and subsequently pass through the digestion process. After digestion, the color bodies become a part of the black liquor and are ultimately burned in the recovery furnace. However, for each of the processes noted using lime to decolorize the effluent, the effectiveness of the reaction has been found to be very much pH dependent. Moreover, in the process utilizing a calcination of the lime sludge, problems have arisen with respect to the difficulty in dewatering the lime sludge prior to calcination.

Therefore, it is an object of the present invention to provide an improved process for the treatment of the effluent from a kraft paper making process that is as effective as the massive lime treatment processes that are currently being advocated by the paper making industry.

A still further object of the present invention is to provide a process for removing the color bodies from a typical kraft paper making effluent using a color body occlusion mechanism not heretofore disclosed in the prior art.

Yet another object of the present invention is to provide a process for decolorizing a typical combined kraft paper making effluent which is effective at or near a neutral pH and which is substantially independent of the pH of the effluent in contrast to the processes of many of the prior art patents. For the purpose of the present invention, the combined effluent is defined as the combination of the effluent streams from the pulping operaton, the bleach room chlorination and caustic extract filtrates and the paper making operation.

The above and other objects of the present invention are attained in accordance with the process disclosed by treating the combined effluent from the kraft paper making operation with a barium ion ($Ba^{+2}$) containing material whereby the color bodies in the effluent are removed through occlusion in the barium sulphate ($BaSO_4$) precipitate which forms from the sulphate ($SO_4^{-2}$) already present in the effluent. And, of course, unlike the familiar lime ($Ca^{+2}$) decolorization process, decolorization with barium can be achieved at a neutral pH. Thus it may be seen that the invention disclosed herein makes use of the sulphate in the effluent to form a barium sulphate precipitate. On the other hand, when effluents low in sulphate are to be treated, obviously the efficiency of the process can be improved by adding more sulphate to the effluent. Accordingly, the invention is preferably practiced by first measuring the initial color of the effluent. Then, the amount of sulphate in the effluent is determined and the amount of barium ion containing material and, if necessary additional sulphate ion containing material required to produce the desired degree of decolorization is determined. In the mixture of barium and sulphate a slight excess of sulphate over the stoichiometric ratio is preferred.

In an effort to characterize the mechanism of the color removal process using barium, the processes using lime as the decolorizing agent were studied. Based on information obtained from the studies, good evidence was shown for the presence of ionizable acidic, phenolic and enolic groups in the highly colored pulp mill effluent and primarily the bleaach room effluents consisting of the chlorination and caustic extract stages. Further study illustrated that with the above noted groups in solution, and at an alkaline pH in the presence of lime, the color bodies in solution would become insolubilized in the form of calcium salts as a precipitate. Other work showed that a very large part of the color would go back into solution when the pH was reduced. This work was supported by the description in U.S. Pat. No. 3,531,370 mentioned hereinbefore, wherein the decolorization process disclosed using lime was shown to require a pH of at least 11.3 in order to precipitate the color bodies with the lime. Thus, knowing the conditions for the decolorization reaction using lime, it was surprising to find that barium would decolorize the effluent substantially at or near a neutral pH. Of course, the importance of the discovery that barium ions would remove color from the effluent at a neutral pH was significant since waste disposal standards require that the normal effluent be substantially neutralized before being discharged into a local receiving stream. Thus any additional treatment to the effluent for the purpose of color removal which required a pH adjustment away from a substantially neutral pH was deemed undesirable. Moreover, it was also found that even at an alkaline pH, barium would also remove color bodies at least as effectively as lime on a molor concentration basis.

It was expected and later found from the experiments conducted in developing the present invention, that insoluble barium sulphate ($BaSO_4$) would precipitate from the highly colored effluent upon the addition of a barium ion containing material to the effluent since it was known that the effluent contained sulphate ions ($SO_4^{-2}$). The identity of the precipitate was confirmed with an infared spectra when nearly pure barium sulphate was identified after the precipitate was ashed to remove organic matter. It was also found that at neutral pH, only about the amount of barium necessary to combine with the sulphate in solution was precipitated from the effluent since the excess of barium added remained in solution. This information led to the conclusion that the color removal mechanism of barium was due to an occlusion of color bodies in the barium sulphate crystal. The results achieved were also surprising since no special precautions were taken to promote uniform crystal growth throughout the solution.

In another experiment it was found that if barium sulphate itself (blanc fixe) was added to the effluent, no decolorization occurred. Thus it was concluded that the physical absorption of color bodies onto the barium sulphate crystal was not responsible for the decolorization of the present process and the mechanism of occlusion of the color bodies in the barium sulphate crystal seemed to be a correct explanation.

DETAILED DESCRIPTION

Several highly colored combined kraft paper mill effluents were selected, based on their closely aligned beginning color readings, and treated with different decolorizing materials on an equimolor basis to demonstrate the effectiveness of tthe barium decolorization process and compare it with the other known decolorizing processes.

Both the initial and final color of the effluent samples was measured by the standard technique established by the National Council for Air and Stream Improvement (NCASI) using a spectrophotometer and a Platinum-Cobalt (Pt-Co.) calibration curve. The initial color number was determined after the sample was adjusted to a pH of about 7.6 by adding either acid or base as required followed by filtration through an 0.8 micron pore size membrane filter. Since each sample was a representative combined total effluent at or near a neutral pH to begin with, little adjustment was needed. A percent light transmittance was determined from the spectrophotometer at a wavelength of 465 millimicrons and this number was compared with a standard solution having an assigned color number. The Pt-Co. calibration curve was extended linearly in order that all colors could be measured without dilution. Similarly, the final color readings were taken after adjustment of the pH to about 7.6 as required by the NCASI standard technique.

Since it was known that the color bodies in a highly colored bleach effluent would precipitate out in the form of calcium salts in the presence of $Ca^{+2}$ ions at alkaline pH, the following Example was conducted using the aforementioned combined kraft paper mill effluents, to compare $Ca^{+2}$ and $Ba^{+2}$ in equimolar concentrations at both a neutral and alkaline pH.

EXAMPLE I

In the data shown in Table I, the decolorizing cations ($Ca^{+2}$ and $Ba^{+2}$) were added in equimolar quantities (milli-moles/liter) in finely divided solid form to the effluent samples. The treated samples were stired for approximately 15 minutes, despite the fact that the decolorizing reaction occurred substantially instantaneously, primarily to assure an intimate mixture of the materials. The pH of the samples after treatment was measured and after filtering the treated samples through an 0.8 micron filter (as required by the NCASI standards) the pH was once again adjusted to about 7.6 for the final color measurement.

TABLE I

Equimolar Comparison of Decolorization Using Calcium and Barium ions at Two Treatment Levels

| Treatment m mole/l. | Beginning Color pH 7.6 | pH after Treatment | Final Color pH 7.6 | Color Units Removed per m mole/l. |
|---|---|---|---|---|
| 1.54 $BaCl_2$ | 1450 | 7.20 | 1070 | 246 |
| 1.54 CaO | 1500 | 9.1 | 1310 | 123 |

TABLE I-continued

Equimolar Comparison of Decolorization Using Calcium and Barium ions at Two Treatment Levels

| Treatment m mole/l. | Beginning Color pH 7.6 | pH after Treatment | Final Color pH 7.6 | Color Units Removed per m mole/l. |
|---|---|---|---|---|
| 1.54 $CaCl_2$ | 1590 | 7.7 | 1590 | — |
| 7.7 $Ba(OH)_2$ | 1500 | 11.6 | 109 | 180 |
| 7.7 $BaCl_2$ | 1450 | 6.85 | 467 | 127 |
| 7.7 $CaO$ | 1500 | 11.3 | 413 | 141 |
| 7.7 $CaCl_2$ | 1590 | 7.7 | 1480 | 14 |

The results in Table I show that the addition of $BaCl_2$ and $CaCl_2$ at both levels (1.54 and 7.7 m mole/l.), did not appreciably affect the pH of the sample, however, the addition of CaO (lime) and $Ba(OH)_2$ at the same levels raised the pH substantially. In addition, the results show that the addition of barium ions to the effluent sample removes color under alkaline conditions at least as effectively as calcium ions. And, of course, it is also apparent from the results in Table I that the barium ions occulude a significant amount of the effluent color at or near a neutral pH while the calcium ions are substantially ineffective at the same pH. No attempt was made in the experiments shown in Table I to measure the amount of sulphate in the effluent nor was there any attempt made to achieve a stoichiometric mixture of barium ions and sulphate. However, the data in Table I does show that the final colors are generally reduced with increased concentrations of barium ion containing decolorizing material.

In order to further show the effective color reduction of the effluent using barium ions at a substantially neutral pH, addtional experiments were conducted substantially as set forth in Example I, but using several different effluent samples. The results are illustrated below in Table II.

TABLE II

Decolorization At Neutral pH With Barium Ions

| Treatment $BaCl_2$ m mole/l. | Beginning Color pH 7.6 | pH after Treatment | Final Color pH 7.6 | Color Units Removed per m mole/l. |
|---|---|---|---|---|
| 1 | 647 | 7.45 | 359 | 288 |
| 5 | 647 | 7.45 | 102 | 109 |
| 1 | 730 | 7.0 | 456 | 274 |
| 5 | 730 | 6.75 | 180 | 110 |
| 1 | 800 | 7.2 | 504 | 296 |
| 5 | 800 | 7.1 | 184 | 123 |
| 1 | 860 | 6.95 | 720 | 140 |
| 5 | 860 | 6.90 | 188 | 134 |
| 1 | 1700 | 7.85 | 1260 | 440 |
| 5 | 1700 | 7.35 | 360 | 268 |

The results recorded in Table II show that for several different effluents ranging in initial color from about 647 color units to about 1700 color units and at substantially neutral pH, the addition of 1 m mole/l. $BaCl_2$ produced color reductions ranging from about 140 to 440 color units per m mole/l. addition. Meanwhile, with the addition of 5 m mole/l. $BaCl_2$, the color reductions ranged from about 109 to 268 color units per m mole/l. addition.

From this data it may be seen that the decolorization reaction with barium ions proceeds rapidly at first and then tends to taper off as additional decolorizing material is added. However, based on the final colors achieved with the effluents sampled in Table II, and in the absence of any Federal or State regulations setting standards for the final colors of effluents before they can be returned to receiving waste streams, apparently a final color in the range of from about 100 to 300 color units would be considered good when the dilution factor of the receiving stream was taken into consideration. Therefore, based on the data shown in Table II, clearly the decolorization process using barium ions produces a satisfactory final effluent at a substantially neutral pH, depending on the level of addition of barium ion containing material. Moreover, based on the limited data shown in Table II, obviously the more highly colored effluents will require larger doses of the barium ion containing decolorizing material than the less highly colored effluents to reach the desired satisfactory final color level.

Recalling, of course, that it was expected, and found from these experiments that insoluble barium sulphate ($BaSO_4$) would precipitate from the effluent upon the addition of a barium ion containing material, the mechanism for the precipitation reaction was not immediately understood. Therefore, in order to substantiate the theory that the color bodies were removed from the effluent due to occlusion in the barium sulphate ($BaSO_4$) crystal, the following experiment was conducted.

Three effluent samples were selected having known color values and the sulfate ($SO_4$) content of each sample was determined gravimetrically by the addition of excess $BaCl_2 \cdot 2H_2O$ (column 1 of Table III). Knowing the amount of sulfate in each sample, the amount of barium ions required to completely precipitate the sulphate was calculated (column 2 of Table III), and an excess of Barium (1055 ppm $BaCl_2$) was added to another sample of each effluent substantially as described in Example I. Later on, the amount of barium precipitated during the decolorization reaction was obtained by measuring the amount of barium remaining in the samples after decolorization, and subtracting those figures from the amount of barium added to each effluent sample (column 3 of Table III). The barium remaining in solution after the decolorization reaction was determined gravimetrically by the addition of ammonium sulphate $(NH_4)2SO_4$ to the filtrate to precipitate the barium out. Finally, the difference between the amount of barium ions actually precipitated out of solution (column 3) and the amount of barium ions calculated (column 2), based on the sulphate in the solution was determined (column 4) and the % color reduction was calculated (column 5).

TABLE III

Barium Distribution in Decolorization at Neutral pH ($Ba^{+2}$ 1055 ppm addition)

| (1) $SO_4$ Content ppm | (2) $Ba^{+2}$ Reqd. ppm | (3) $Ba^{+2}$ Precpt. $Ba^{-2}$ excess ppm | (4) % Color ppm | (5) Reduction |
|---|---|---|---|---|
| 382 | 545 | 634 | +89 | 67.8 |
| 347 | 496 | 491 | −5 | 77.0 |
| 299 | 428 | 411 | −19 | 84.2 |

The results of the data reproduced in Table III show that only about the stoichiometric amount of barium necessary to combine with the molor quantity of sulphate in the effluent was precipitated from the effluent substantiating the conclusion that the mechanism for the color removal process using barium was due to the occlusion of color bodies in the barium sulphate crystal. Moreover, it should be understood that an even greater color reduction could have been obtained with the experiments shown in Table III if both more barium ion containing material and sulphate had been added to the effluents.

Another set of experiments were conducted to show the effectiveness of the effluent decolorization process using a barium ion containing material at various pH conditions. The work which led to the present invention was undertaken to investigate the decolorization reaction using lime or calcum ions. However, along the way, it was discovered that barium ions would also decolorize the effluent, and surprisingly, barium showed evidence of being effective at or near a neutral pH. Subsequently, however, it was learned that the barium decolorization process would perform well regardless of the pH of the effluent. These latter results are shown by the data set forth in Table IV for two different effluents. The conditions and experimental techniques used in obtaining the data in Table IV were the same as those used to obtain the data shown in Table I.

TABLE IV

Decolorization with Barium Ions

| Treatment $BaCl_2$ m mole/l. | Beginning Color pH 7.6 | pH before Treatment | Final Color pH 7.6 | Color Units Removed per m mole/l. | Color Reduction % |
|---|---|---|---|---|---|
| 0 | 470 | 3 | 470 | — | — |
| 1.54 | 470 | 3 | 310 | 103 | 34 |
| 7.7 | 470 | 3 | 260 | 27 | 45 |
| 1.54 | 470 | 7 | 260 | 136 | 45 |
| 7.7 | 470 | 7 | 110 | 46 | 76 |
| 1.54 | 470 | 11 | 60 | 266 | 87 |
| 7.7 | 470 | 11 | 25 | 57 | 95 |
| 0 | 1380 | 3 | 1380 | — | — |
| 1.54 | 1380 | 3 | 780 | 389 | 44 |
| 7.7 | 1380 | 3 | 400 | 127 | 71 |
| 1.54 | 1380 | 7 | 840 | 350 | 39 |
| 7.7 | 1380 | 7 | 230 | 149 | 83 |
| 1.54 | 1380 | 11 | 300 | 701 | 78 |
| 7.7 | 1380 | 11 | 190 | 154 | 86 |

The experimental results recorded in Table IV demonstrate the combined effects of pH and the level of addition of decolorizing material on the decolorization of effluents using barium ions. As expected, with both effluents at a constant pH, increasing the level of addition of $BaCl_2$ produced a concurrent decrease in the final color of the effluents. Moreover, with the arbitrarily selected treatments of 1.54 m mole/l. $BaCl_2$ and 7.7 m mole/l., $BaCl_2$ the efficiency of the process increased with increasing pH. The only exception occurred in the treatment of the most highly colored effluent (initial color 1380 color units), where the efficiency of the process showed a drop from pH 3 to pH 7 at the 1.54 m mole/l. $BaCl_2$ level of addition. Moreover, for each effluent sample tested, a satisfactory final effluent (100 to 300 color units) was achieved at each pH level. Therefore, for the sake of the present invention, good decolorization may be defined as requiring the addition of sufficient barium ion containing material to produce a final effluent color of from about 100 to 300 color units at a neutral or higher pH. Of course, it should also be understood that the effluent must contain or be supplied with sufficient sulphate ions in order to insure that all of the barium ions added will precipitate out of the effluent to produce the desired decolorization.

In conclusion, it should be noted that the color removal step does not interfere with any of the other operations of the kraft papermaking process and the decolorization process would obviously be useful for color removal of other types of papermaking processes as long as the effluents contained or were supplied with sulphate. Moreover, even though the examples and results, described hereinbefore were obtained with laboratory experiment, it is believed that the invention would find equal success in an industrial application. For instance, in a full scale paper mill application the barium ions could be added to the sulphate containing total final effluent either in solution or in a finely divided solid form under mild agitation where an intimate mixture would be assured. Since the decolorization reaction occurs substantially simultaneously with the addition of the barium ions, the occluded color bodies would then be allowed to settle to the bottom of a conventional settling tank in the form of insoluble $BaSO_4$ and the treated effluent could then be conveyed to the local receiving stream. The sludge obtained at the settling tank would later be collected for disposal, or alternatively the precipitated $BaSO_4$ could be reconverted into soluble $Ba^{+2}$ or used as a filler material or extender pigment in the papermaking process. In yet another potential paper mill application, the precipitated $BaSO_4$ could be collected in a filtration step with the same possible reuse potential.

Thus, while only a preferred embodiment of the present invention has been described in detail, many modifications may occur to those skilled in the art, and it is desired that the invention herein be limited only by the scope of the appended claims.

I claim:

1. The process for decolorizing the combined total waste effluent of a pulp and paper mill at a neutral pH or higher wherein the waste effluent contains highly colored color bodies comprising the steps of:
   a. measuring the original color of a combined total pulp and paper mill waste effluent containing color bodies and sulphate;
   b. measuring the quantity of barium ion containing water soluble material required to produce at least about a 45% reduction in the color of the effluent;
   c. adjusting the mole weight of sulphate in the waste effluent to equal or slightly exceed the mole weight of barium ion containing material determined in step (b);
   d. introducing a barium ion containing water soluble material selected from the group consisting of $BaCl_2$ and $Ba(OH)_2$ under mild agitation to the waste effluent to produce a barium sulphate precipitate with the color bodies from the effluent occluded therein;
   e. separating the barium sulphate precipitate and occluded color bodies from the decolorized effluent; and,
   f. discharging the decolorized effluent at a final color no greater than about 300 color units to a receiving stream.

2. The process of claim 1 wherein the barium ion containing water soluble material is $BaCl_2$.

* * * * *